Patented June 2, 1931

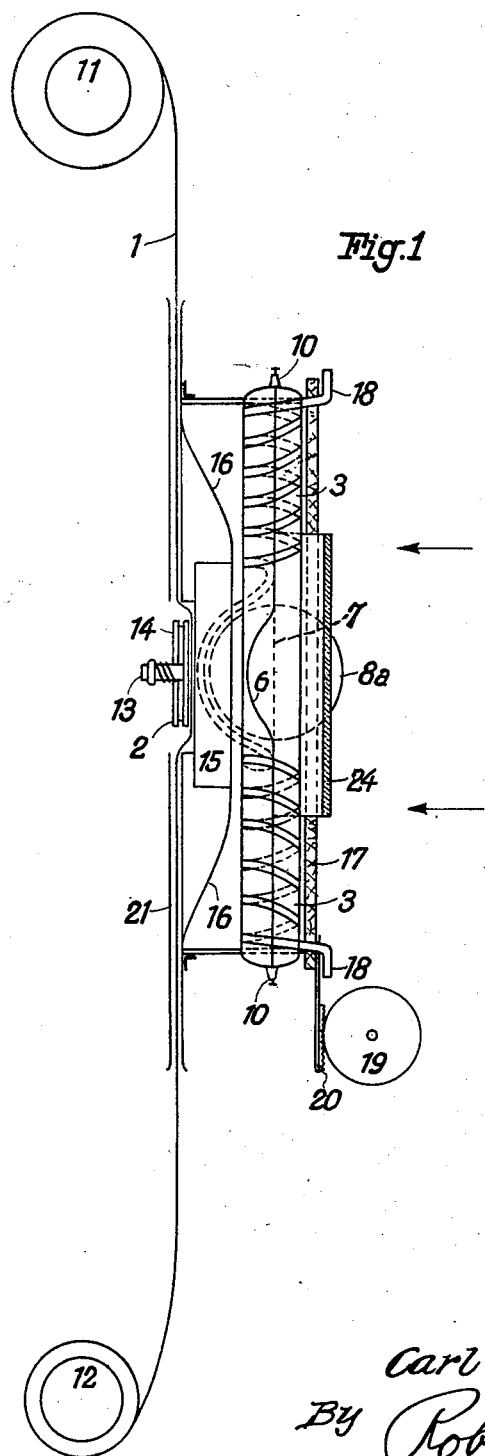

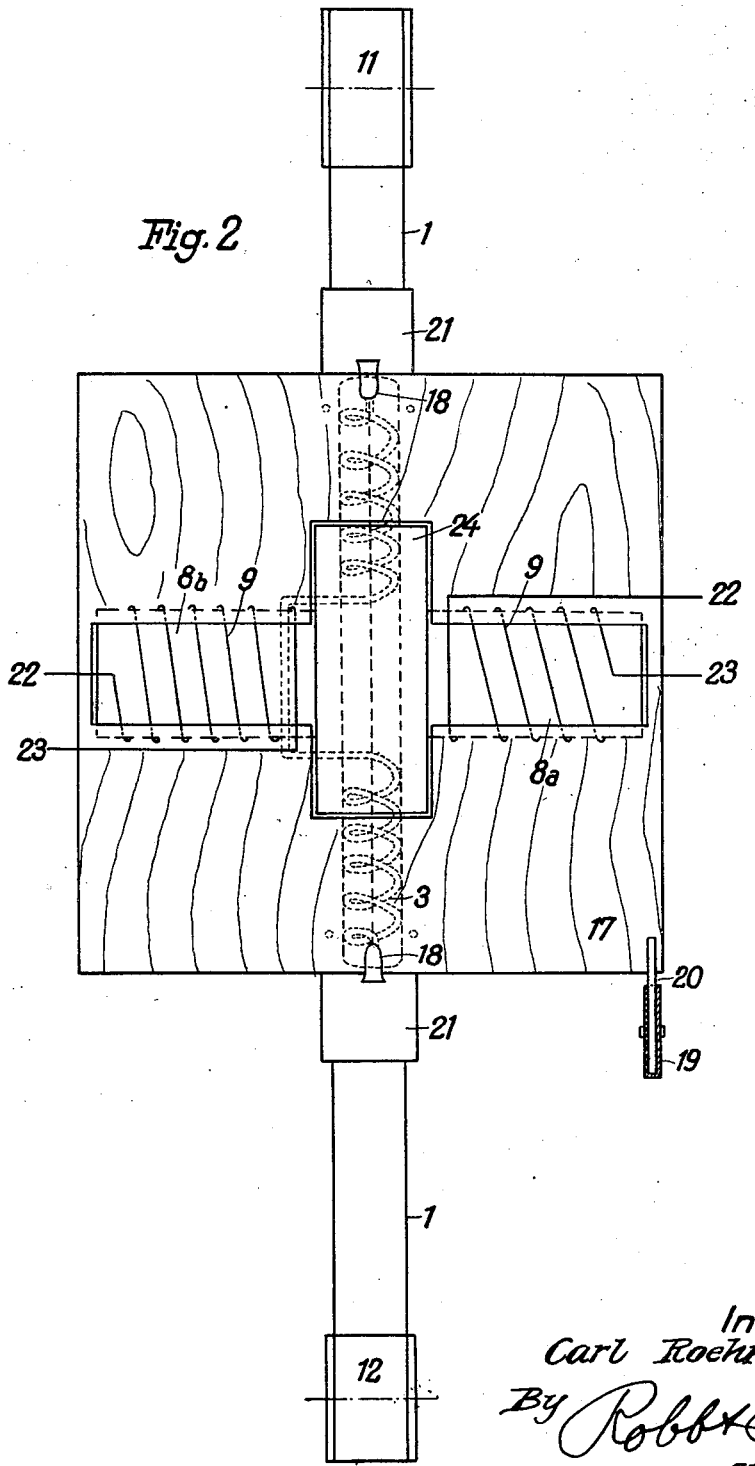

1,807,933

UNITED STATES PATENT OFFICE

CARL ROEHRICH, OF BERLIN, GERMANY, ASSIGNOR TO THE FIRM SILFREE AKTIEN-GESELLSCHAFT (SILFREE LIMITED) VADUZ, OF LIECHTENSTEIN, GERMANY

APPARATUS FOR PHOTOGRAPHIC COPYING PURPOSES

Application filed July 6, 1929, Serial No. 376,304, and in Germany July 7, 1928.

The invention is concerned with apparatus for copying purposes in the production of moving picture films and may be considered an improvement over the invention as described and claimed in my co-pending application Serial No. 347,604 filed March 16th, 1929. This co-pending application may be referred to for structural details of the invention disclosed in the present specification. However for convenience sake all points considered important and necessary for understanding will be explained hereinafter.

Practice and numerous experiments have established the use of certain light sources for copying purposes. The most common light source is the one in which discharges are effected through an atmosphere of mercury vapors. Such light sources produce chemically active rays which are particularly suitable for transmitting photographic pictures from a given negative onto a sensitized film or plate. The efficiency of such light sources is, however, under ordinary conditions not fully realized.

In order to utilize the entire effect of a light source, it was tried to copy a plurality of films simultaneously. This was accomplished by a feeding apparatus in which a number of films were guided past the light source and transverse thereto. The efficiency of the light source was thereby increased to a notable extent; however a certain amount of the efficiency was lost on account of the fact that spaces between the various films had to be provided.

Another attempt to utilize the lamp as light source to a fuller extent consists in conducting one film longitudinally past the light source. The difficulties which occurred with this arrangement consisted in non-uniform distribution of light upon the film, and in difficulties to register the sensitized film and the negative for the entire length of the light source. In order to explain this point a little further, attention is called to the ordinary shape of a mercury vapor light source, which usually has the form of an elongated tube. The discharge is effected within the gas filled atmosphere of this tube, and the path of the discharge is approximately in the center of the tube and longitudinal thereto. Now, when the film was conducted longitudinally past the tube the center of the film received more light than the edges; in other words, the film was not uniformly exposed to the light. The difficulties in registering the film and negative in the last described arrangement are due to mechanical imperfections manifesting themselves under the high temperatures occurring in close proximity to the lamp.

The copying methods described above were limited to utilizing merely the intensity naturally rendered by the lamp, and it is quite reasonable to assume that the difficulties experienced were due to this limiting factor. Thorough investigations have shown that the actinic rays emanating from the discharge path within the gaseous atmosphere of the lamp are partially absorbed by the gaseous atmosphere. The brightly lighting central discharge path is surrounded by a gaseous atmosphere less lighting, which consists chiefly of mercury vapors. It is a well established fact, that a medium capable of emitting rays of a certain wave length also possesses the quality for strongly absorbing these rays. This accounts for the phenomenon for the absorption noticed above.

The principal object of the present invention is to eliminate the difficulties mentioned in the foregoing paragraphs and to increase the efficiency of the lamp and the entire copying procedure.

Another object is to avoid the detrimental absorption of actinic rays within the gaseous atmosphere of the lamp.

A further object is to increase the efficiency of the lamp by interposing between the discharge tube and the film a resonance lamp filled with mercury vapors, which responds to the action of the discharge tube, furnishing efficient emittance of active rays.

Another object of the invention is to reduce the time of exposure of the film or plate, thereby accelerating the copying process and rendering it more economical than was formerly possible.

Still another object is to provide an efficient apparatus by utilizing a magnet required for deflecting the path of light source for rendering a means for reflecting the light.

In the drawings:

Fig. 1 is a diagrammatic rear elevation of the improved copying apparatus forming the embodiment of the present invention; and Fig. 2 is a view at right angles to Fig. 1.

The foregoing objects will be better understood from a detailed explanation, which will now be presented.

According to the invention one or more magnetic or electromagnetic bodies are arranged near the discharge tube in order to deflect the path of discharge towards the wall of the tube and directed to the copying area. The effect of deflecting the path of discharge consists in reduction of the sphere of absorption within the tube. In other words the gaseous atmosphere is reduced at the copying area and the detrimental influence of the mercury vapors is thereby eliminated.

It will be readily seen that there are numerous possibilities for arranging the magnetic bodies in relation to the tube. For example, two magnets may be placed opposite each other in an axis transversal to the tube and in rear of and substantially parallel to the copying area. Other arrangements of the magnetic bodies may be indicated in case it is desired to expose a plurality of films simultaneously. Precaution has, however, to be taken with regard to the magnetic interference between the coils of the various fields.

Many other possibilities of arranging the coils will present themselves to anyone familiar with this subject.

Suitable cooling means may be arranged in order to prevent the raise of temperature detrimental to the film. Many cooling arrangements are known; the selection of the proper arrangement will entirely depend on local conditions.

The interposing of a resonance lamp, as mentioned previously, will also depend on local conditions and may be carried out with or without the use of magnetic means for deflecting the path of discharge in the discharge tube. Such a resonance lamp consists of an evacuated tube or chamber into which a drop of mercury was inserted prior to its evacuation. The evacuated chamber vapor may be excited by light rays of the same wave length which the vapor itself may emit. Therefore it will be excited by the action of the mercury discharge tube and will serve as a strong source of light for copying. A quality of this resonance lamp is to emit uniform light over a relatively large area. Therefore, the interposing of such a resonance lamp between the discharge tube and the copying area serves to eliminate the non-uniform emittance of light mentioned previously. It may be said at this point that the shape of the resonance lamp might present a plane face to the copying area. This face of the resonance lamp may even serve as a guiding plane for the film or plate.

The invention will now be described with reference to the accompanying drawings forming part of this specification. It will be understood, of course, that the accompanying drawings show only, schematically, the essentials of the instant case. All details not claimed in the present application are disclosed in the co-pending application mentioned previously, and this co-pending application may be looked up for any points not specifically explained in the present case.

Referring to Fig. 1 of the drawings, reference numeral 17 designates a frame or support which carries the discharge tube 3 attached to the frame in any suitable manner. The terminals for the discharge tube are indicated by the reference character 10. Attached to the frame are the electro-magnets 8a and 8b having windings 9 and conductors or leads 22 and 23. The negative 1 and film are suitably guided by the guides 21 past the copying opening 2, a toothed rack 20 and a stationary gear 19 being provided for moving the apparatus attached to the frame relative to the film and negative 1.

In rear of the discharge tube 3 is a suitable reflector or mirror 24 preferably carried by and directly attached to the magnets 8a and 8b, the shape of the mirror corresponding to the shape of the discharge tube, according to whether the latter is point-shaped or elongated. The purpose of such a mirror attached to the magnets is to increase the efficiency of the apparatus by further increasing the intensity of the light source in addition to the increase obtained by the deflection of the discharge. It is possible with such a construction to use film material which has heretofore been considered not to be possessed of sufficient sensitivity. By directly attaching the mirror to the magnets, the mirror and magnets may be moved or adjusted as a unit with regard to the picture to be copied, to the exact and desired position for directing the light upon the film and negative, this being a very desirable feature.

For the purpose of exposure, the film and negative are guided past the copying opening 2 and are wound from drum 11 upon drum 12. Therefore, it may be said that both drums 11 and 12 rotate clockwise in steps during the copying operation.

The adjustment of the apparatus and means attached to frame 17 relative to the film and negative, which is effected by gear 19 and rack 20, is desirable for registering the window or copying area 2 and lamp 3 with respect to the film and negative so as to insure at all times that the exposure of a complete picture is accomplished within the copying area. Reference numeral 7 indicates the normal path of discharge which would occur under ordinary circumstances whereas 6 indicates the deflected path of discharge which occurs under the influence of the magnets. Suitable provision for cooling the discharge tube is made, as shown by the cooling tube or pipe 18 associated with the discharge tube.

Intermediate the copying area and the discharge tube is the resonance lamp 15 which is held in position by means of spring 16. This lamp may be of rectangular shape and having its faces parallel to the copying opening. The faces of the resonance lamp may be of any suitable material permeable to actinic rays, such as, for example, quartz, whereas the sides may be of any other suitable material, as, for example, glass. The face of the resonance lamp which is adjacent to the copying opening may serve as a guiding plane for the film and negative. A suitable device, indicated by numerals 13 and 14, is provided for guiding the film and the negative past the copying opening close to the face of the resonance lamp 15.

The operation will be described next.

For copying purposes, the film and negative (as is particularly explained in the copending application referred to) are, during the action of the apparatus, advanced step by step past the copying opening which is located at the left of the light source 3, so that one picture after the other is exposed to the rays emitted by the light source. The light source is connected to a source of current in order to produce a discharge through the lamp, which, as has been explained, is assumed to be of elongated shape. When the electro-magnets 8a and 8b are energized, the path of discharge through the tube is deflected, so that a decrease of the distance between the ray-emitting section and the walls of the discharge tube is effected. Since the discharge tube is filled with mercury vapor, the decrease of this distance will effect a corresponding decrease of the gaseous atmosphere and will therefore result in an increase of the light intensity of the discharge tube.

It is apparent, that the addition of the reflecting mirror 24 will add to the efficiency of the arrangement since the light intensity is increased by the reflecting qualities of the mirror.

It will be understood, of course, that the inventive idea has merely been graphically represented in the drawings. Details and modifications of various kinds will readily suggest themselves to anyone experienced in the art, and I, therefore, do not wish to be limited to the specific details of construction herein shown and described as changes and alterations may be made without departing from the spirit of the invention as defined by the appended claims.

What is considered new and desired to secure by Letters Patent is pointed out in the following claims:

I claim:

1. A light source for photographic copying purposes, comprising an electric discharge tube wherein discharges are effected through a gaseous atmosphere, magnetic means for deflecting the course of discharge within said tube and means for reflecting the light rays emitted by said tube.

2. A light source for photographic copying purposes, comprising an electric discharge tube wherein discharges are effected through a gaseous atmosphere, electro-magnetic means for producing a constant deflection of the course of discharge within said tube and means for reflecting the light rays emitted by said tube.

3. A light source for photographic copying purposes, comprising an electric discharge tube wherein discharges are effected through a gaseous atmosphere, together with magnetic means for deflecting the course of discharge within said tube, said magnetic means including a core provided with a winding, and mirror means associated with said core for reflecting the light rays emitted by said light source.

4. In an apparatus for photographic copying purposes a light source wherein discharges are effected through a gaseous atmosphere, an electromagnet for deflecting the course of discharge within said tube, and mirror means fixedly connected with said magnet for reflecting the light rays emitted by said source.

In testimony whereof I hereunto affix my signature.

CARL ROEHRICH.

CERTIFICATE OF CORRECTION.

Patent No. 1,807,933.                              Granted June 2, 1931, to

CARL ROEHRICH.

It is hereby certified that the address of the assignee in the above numbered patent should have been written and printed as of Vaduz, Liechtenstein, instead of "Vaduz, of Liechtenstein, Germany", as shown by the records of assignments in this office; and that the said Letters Patent should be read with this correction therein that the same may conform to the record of the case in the Patent Office.

Signed and sealed this 22nd day of September, A. D. 1931.

(Seal)

M. J. Moore,
Acting Commissioner of Patents.